US007389442B1

(12) United States Patent
Lee

(10) Patent No.: US 7,389,442 B1
(45) Date of Patent: Jun. 17, 2008

(54) APPARATUS AND METHOD FOR SELF DIAGNOSIS, REPAIR, REMOVAL BY REVERSION OF COMPUTER PROBLEMS FROM DESKTOP AND RECOVERY FROM BOOTING OR LOADING OF OPERATING SYSTEM ERRORS BY REMOVABLE MEDIA

(75) Inventor: Kang-dong Lee, Suwon (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 09/221,475

(22) Filed: Dec. 28, 1998

(30) Foreign Application Priority Data

| Dec. 26, 1997 | (KR) | 97-74450 |
| Dec. 26, 1997 | (KR) | 97-74451 |
| Dec. 26, 1997 | (KR) | 97-74453 |
| Jun. 16, 1998 | (KR) | 98-22575 |

(51) Int. Cl.
*G06F 11/00* (2006.01)
(52) U.S. Cl. .................... 714/2; 714/25; 714/15
(58) Field of Classification Search ........... 713/1–2, 713/100; 714/2–16, 25–27, 44
See application file for complete search history.

(56) References Cited

U.S. PATENT DOCUMENTS

| 3,575,589 A |   | 4/1971  | Neema et al. |
| 4,866,712 A |   | 9/1989  | Chao |
| 5,099,485 A |   | 3/1992  | Bruckert et al. |
| 5,159,597 A |   | 10/1992 | Monahan et al. |
| 5,463,766 A | * | 10/1995 | Schieve et al. ............. 713/2 |

(Continued)

FOREIGN PATENT DOCUMENTS

JP       9-330141       12/1997

OTHER PUBLICATIONS

Korean Notice to Submit Response, Aug. 2000, Korea.

*Primary Examiner*—Raymond N Phan
(74) *Attorney, Agent, or Firm*—Robert E. Bushnell, Esq.

(57) ABSTRACT

A computer system for easily fixing a generated conflict, and a method thereof are provided. This computer system includes a CD-ROM for fixing a conflict, and a control unit. The control unit includes a state information recording portion for collecting state information on the computer system and recording the collected information in the auxiliary memory, a conflict sensing portion for sensing a general protection fault, a system registry fault, and a system hardware information abnormality when the computer system operates, and reporting the sensed faults to a user via the input output device, a state diagnosis portion for diagnosing the presence or absence of abnormality in the computer system according to a user's instruction, attempting to fix the abnormality using diagnosed contents when the abnormality is sensed, and reporting to the user via the input output device abnormality incapable of being fixed by the diagnosed contents, and an existing state reverting portion for reverting the computer system to a state when state information selected by the user among state information recorded in the state information database was produced. Accordingly, a conflict generated on a personal computer system can be easily cured. When an unrepairable conflict occurs, the computer system with the conflict can easily revert to a previous state using existing state information. Also, when a serious conflict is generated on the auxiliary memory unit including a hard disk device, the conflict can be easily repaired by image files recorded in the CD-ROM.

29 Claims, 8 Drawing Sheets

U.S. PATENT DOCUMENTS

| | | | |
|---|---|---|---|
| 5,469,573 A * | 11/1995 | McGill et al. | 717/127 |
| 5,632,013 A | 5/1997 | Krygowski et al. | |
| 5,694,600 A * | 12/1997 | Khenson et al. | 713/2 |
| 5,713,024 A * | 1/1998 | Halladay | 717/11 |
| 5,715,456 A * | 2/1998 | Bennett et al. | 713/2 |
| 5,764,878 A | 6/1998 | Kablanian et al. | |
| 5,784,549 A * | 7/1998 | Reynolds et al. | 714/24 |
| 5,787,246 A * | 7/1998 | Lichtman et al. | 709/220 |
| 6,016,553 A * | 1/2000 | Schneider et al. | 714/21 |
| 6,073,220 A * | 6/2000 | Gunderson | 711/162 |
| 6,122,734 A * | 9/2000 | Jeon | 713/2 |
| 6,170,055 B1 * | 1/2001 | Meyer et al. | 713/2 |
| 6,230,285 B1 * | 5/2001 | Sadosky et al. | 714/14 |
| 6,263,378 B1 * | 7/2001 | Rudoff et al. | 719/327 |
| 6,272,628 B1 * | 8/2001 | Aguilar et al. | 713/2 |
| 6,289,449 B1 * | 9/2001 | Aguilar et al. | 713/2 |

* cited by examiner

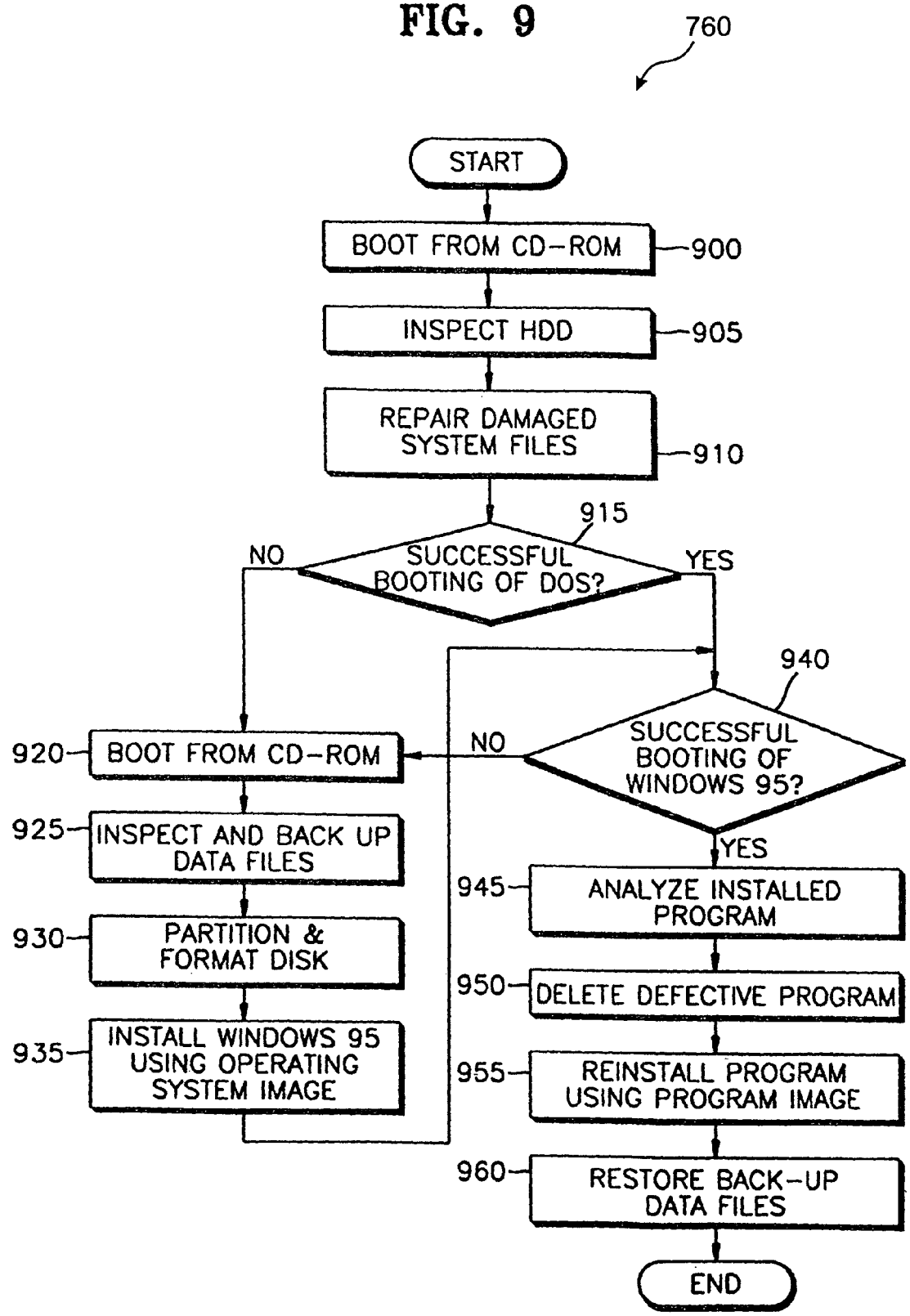

APPARATUS AND METHOD FOR SELF DIAGNOSIS, REPAIR, REMOVAL BY REVERSION OF COMPUTER PROBLEMS FROM DESKTOP AND RECOVERY FROM BOOTING OR LOADING OF OPERATING SYSTEM ERRORS BY REMOVABLE MEDIA

CLAIM OF PRIORITY

This application makes reference to, incorporates the same herein, and claims all benefits accruing under 35 U.S.C. § 119 from applications entitled CD-ROM And Method For Recovering Computer System Having Conflicts, Computer System Processing the Function of Recovering from the Conflicts And Method There of and Computer And Method For Recovering Itself to a State Prior to Conflict previously filed in the Korean Industrial Property Office on the 26th day of December 1997 and duly assigned Application Nos. 97-074450, 97-074451 and 97-074453 and an application entitled Computer and Method for Recovering Itself to the State Prior to Conflict previously filed in the Korean Industrial Property Office on the 16th day of June 1998 and duly assigned Application No. 98-022575.

FIELD OF THE INVENTION

The present invention relates to a computer system, and more particularly, to a computer system which gives an automatic fixing function when a conflict occurs, and an automatic conflict fixing method.

DESCRIPTION OF THE RELATED ART

U.S. Pat. No. 5,159,597 to Monahan et al describes a Generic Error Recovery method and apparatus. The error recovery subsystem employs a user editable file including the rules for defining the system state, the error states, and the sequences of recovery actions to be taken depending upon the comparison between the system state and the error states. Actions that constitute error recovery comprise restarting a software process, reinitializing a data area, rebooting a central processing unit, and resetting a piece of hardware. What is needed is a computer system that first tries to repair the conflict. If this fails, the system then tries to revert or reset the computer system to a normal state that occurred prior to the conflict.

SUMMARY OF THE INVENTION

To solve the above problem, it is an object of the present invention to provide a computer system having a conflict repair function, which allows a user to cure the conflict or revert the computer system to a previous state.

It is another object of the present invention to provide a method of reverting a computer system to a previous normal state when a conflict is sensed from the computer system.

It is still another objects of the present invention to provide a recording medium for easily fixing a conflict occurring on an auxiliary memory unit of a computer system, and a method thereof.

Accordingly, to achieve the first object, there is provided a computer system having a conflict repair function and including a control unit, a main memory, an auxiliary memory, and an input output device, wherein the control unit comprises: a state information recording portion for collecting state information on the computer system and recording the collected information in the auxiliary memory; a conflict sensing portion for sensing a general protection fault, a system registry fault, and a system hardware information abnormality when the computer system is operated, and reporting the sensed faults to a user via the input output device; a state diagnosis portion for diagnosing the presence or absence of abnormality in the computer system according to a user's instruction, attempting to fix an abnormality using diagnosed contents when the abnormality is sensed, and reporting to the user via the input output device abnormality incapable of being fixed by the diagnosed contents; and an existing state reverting portion for reverting the computer system to a state when state information selected by the user among state information recorded in the state information database was produced.

To achieve the second object, there is provided a method of reverting a computer system to its previous state, comprising the steps of: (a) collecting and backing up state information of the computer system; (b) sensing a conflict of the computer system and reporting the sensed conflict to a user; and (c) reverting the computer system to a state when state information selected by the user from back-up state information was produced.

To achieve the third object, there is provided a recording medium for fixing a conflict of a computer system, comprising: a boot image loaded in a main memory installed in the computer system when the computer system is booted, for managing the operation of the computer system; a program image consisting of an operating system and application programs to be installed in an auxiliary memory unit of the computer system, and a list of the operating system and application programs; and a conflict repair control program having a code means (a) loaded in the main memory of the computer system for checking whether the auxiliary memory unit is normal, and a code means (b) for repairing damaged files in the auxiliary memory unit using the program image when abnormality exists in the auxiliary memory unit.

To achieve the fourth object, there is provided a method of fixing a conflict generated on an auxiliary memory in a computer system using a CD-ROM device including a CD-ROM, comprising the steps of: (a) setting the CD-ROM device as a master device, booting the computer system, checking a conflict of the auxiliary memory, and repairing a damaged system file; (b) reinstalling an operating system in the auxiliary memory, comprising the substeps of: (b.1) setting the CD-ROM device as a master device and booting the computer system again when a new booting when the auxiliary memory is set as the master device fails; (b.2) backing up data files stored in the auxiliary memory and formatting the auxiliary memory; (b.3) installing an operating system among a program image recorded in the CD-ROM, in the auxiliary memory; and (b.4) setting the auxiliary memory as a master device and newly booting the computer system; (c) reinstalling application programs in the auxiliary memory using the program image recorded in the CD-ROM; and (d) restoring the data file backed up in step (b.2) in the auxiliary memory.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 9 is a flowchart illustrating a process for fixing a conflict generated on an auxiliary memory unit of a computer system using a CD-ROM, according to the present invention.

DETAILED DESCRIPTION OF THE INVENTION

Figure 1:
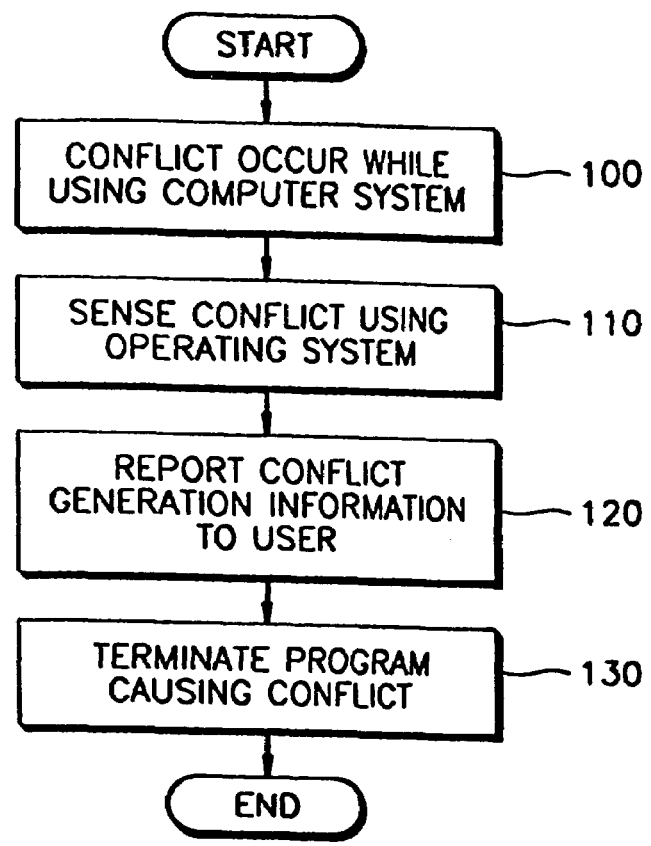
FIG. 1 is a flowchart illustrating an earlier process for repairing a conflict of an earlier computer system.
Figure 2:
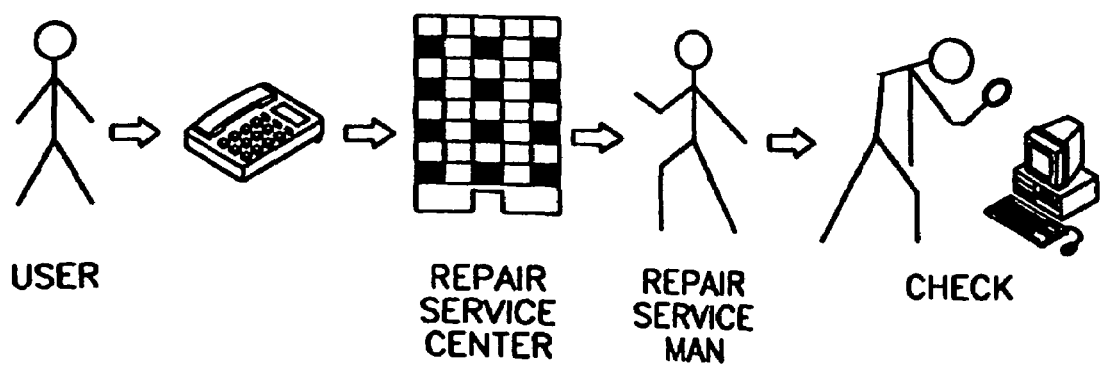
FIG. 2 illustrates a process where a conflict is repaired by a repair service man.

According to earlier computers, as shown in FIG. 1, an operating system (e.g., Windows 95®) of a computer system senses a conflict occurring while the computer system operates (in steps 100 and 110). The operating system generates an error message when the conflict occurs on a device and generates a general protection fault (GPF) or terminates the program without solving the conflict when the conflict occurs during operation of a program (in steps 120 and 130). In this situation, if a user does not repair the generated conflict appropriately, the conflict develops into a fatal error of the entire computer system, and, in a bad case, a hard disk may have to be reformatted or replaced. Meanwhile, when a user has no idea how to fix a conflict generated on a computer system, the user request a repair service to a service center as shown in FIG. 2. Then, the service center receives the request and sends a repair service man to the user, and the repair man directly checks and repairs the computer system of the user.

However, in the earlier method, even though a very small conflict is generated on the computer system, the repair service man must personally visit a place where the computer system is located. Also, when a conflict occurs frequently on the computer system, it is difficult to get a repair service at a proper time. Thus, the user requires considerably a lot of time and costs to repair the conflict occurring on the computer system.

Figure 3:
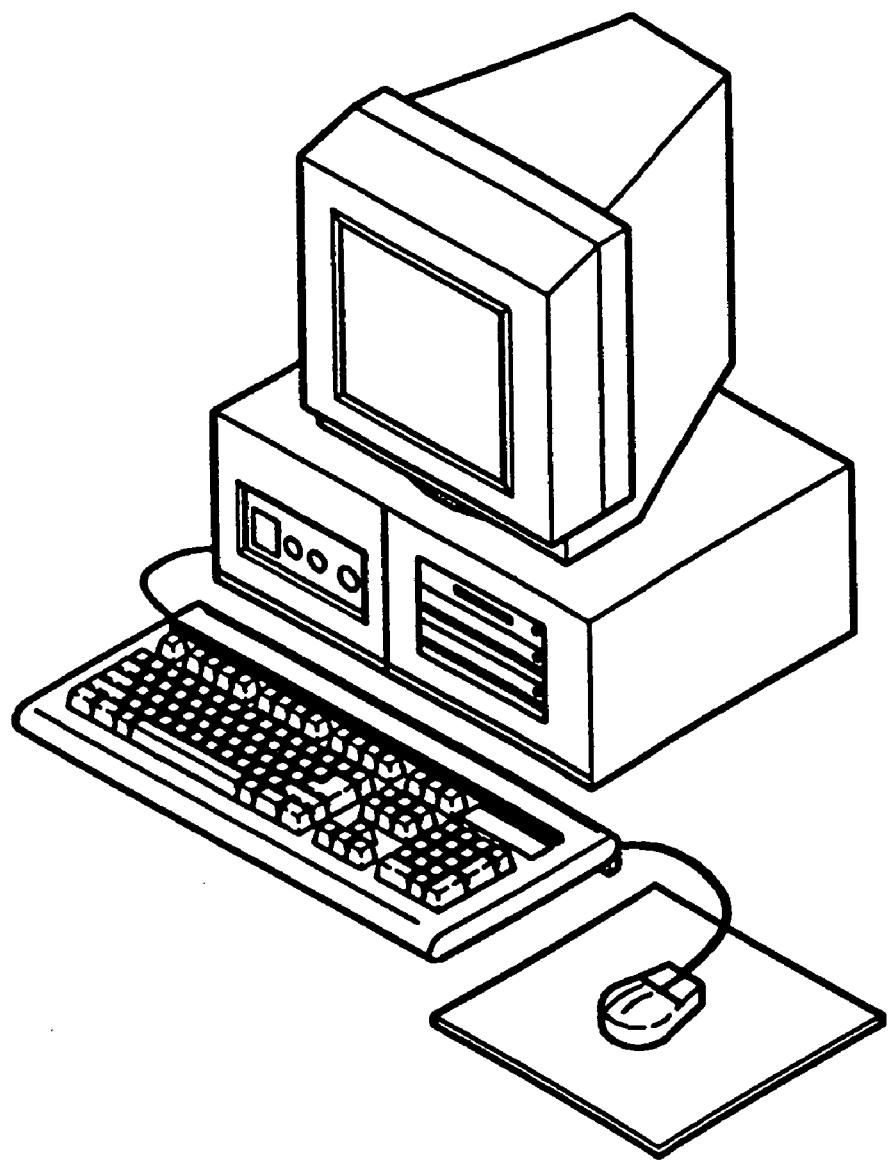
FIG. 3 is an exterior view of a desk top personal computer.
Figure 4:
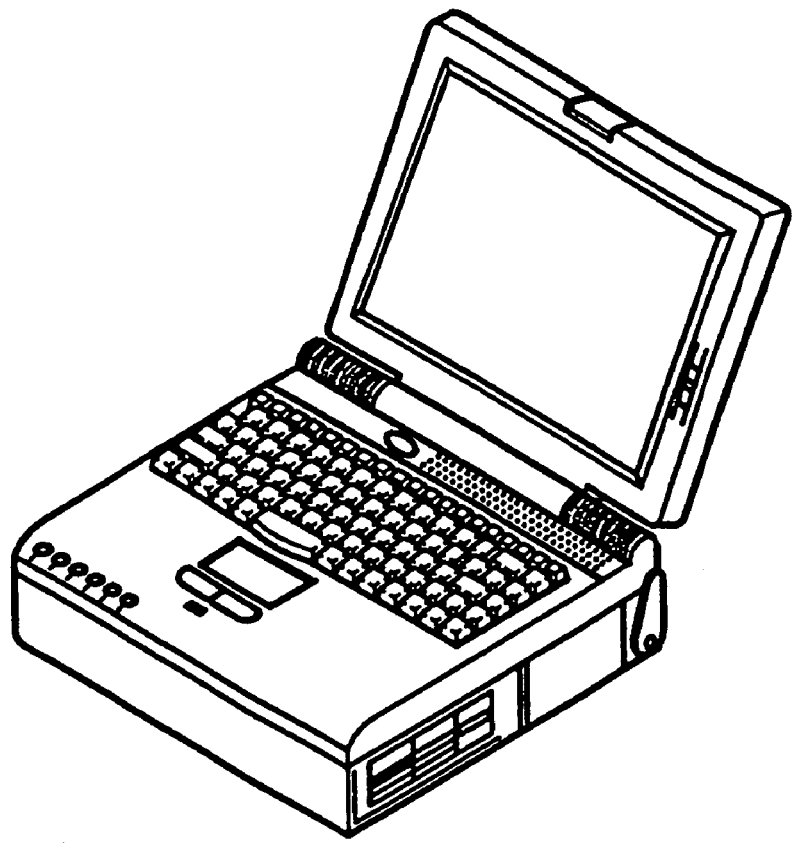
FIG. 4 is an exterior view of a notebook PC.
Figure 5:
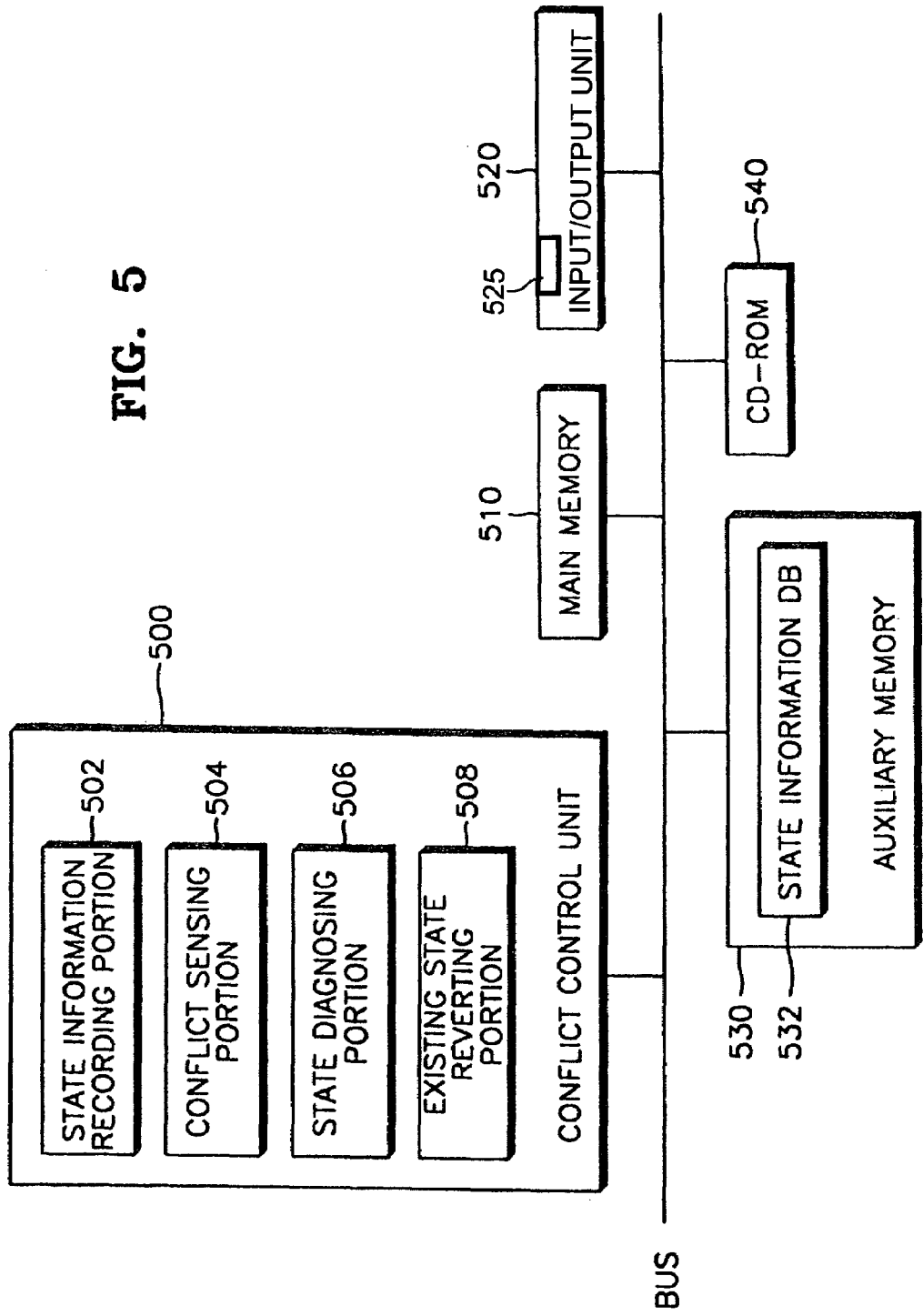
FIG. 5 is a block diagram of the configuration of a computer system having a conflict repair function, according to the present invention.

A computer system having a conflict repair function according to the present invention, is a personal computer (PC) such as a desk top PC shown in FIG. 3 or a notebook PC shown in FIG. 4, and has a configuration as shown in FIG. 5. Hereinafter, an operating system for the computer system according to the present invention is considered as a Windows®.

Referring to FIG. 5, a computer system having a conflict repair function according to the present invention includes a conflict repair control unit 500, a main memory 510, an input output unit 520, an auxiliary memory unit 530, and a conflict CD-ROM 540. The conflict control unit 500 is comprised of a state information recording portion 502, a conflict sensing portion 504, a state diagnosing portion 506, and an existing state reverting portion 508.

The state information recording portion 502 stores the state information of a computer system in the auxiliary memory unit 530 before the computer system terminates or at the point of time determined by a user. The state information includes system information such as a registry of Window95® and state data of device drivers. The state information recording unit 500 forms a state information database 532 in the auxiliary memory unit 530 with the state information. The state information database 532 includes as many state information blocks as determined by the user, and each of the state information blocks contains state information generated by the state information recording portion 502. State information stored for the longest time is updated by new state information. The state information database 532 in the auxiliary memory unit 530 can further include state information of the computer system when it is forwarded, and state information of the computer system immediately before an application program is installed in it.

The conflict sensing portion 504 monitors the computer system periodically and senses generation of a conflict. That is, the conflict sensing portion 504 senses a general protection fault (GPF), a system registry fault, and abnormality of system hardware information, from the computer system. For example, a process handler constituting a kernel of an operating system senses the GPF generated when a program is executed in a virtual memory space.

The state diagnosing portion 506 diagnoses the entire state of the computer system at the time determined by a user, and reports the presence or absence of abnormality to the user. The computer system can include a state diagnostic button to be used when the user recognizes that state diagnosis is necessary. Accordingly, if the user presses down on the state diagnosis button, the state diagnosing portion 506 is immediately driven. The diagnosed content obtained by the state diagnosing portion 506 includes version numbers and information on the operation state of each device, an operating system and application programs installed in the computer system.

The diagnosed contents of the computer system processed the state diagnosing portion 506 will now be described in detail. As for the device, the type of a processor is checked, the capacity of the main memory 510 is found out by checking the state of the main memory 510, the type, resolution, and color of a video card are checked, a check of whether an MPEG card will be recognized is made by executing an MPEG file, an execution state of a modem command is tested, the operations of each of a floppy disk device, a CD-ROM device, and a digital video disk (DVD) device are tested, and serial/parallel ports are checked. As for the operating system, a check of whether system files in a system directory are damaged is made, and a configuration file and registration information are also checked on whether they are damaged. The state diagnosing portion 506 repairs an abnormality by estimating the cause of generation of the abnormality on the basis of the above diagnosed contents. Also, when a conflict incapable of being repaired by current diagnosis contents occurs, the state diagnosing portion 506 produces a message for reporting the fact to the user.

The existing state reverting portion 508 reverts the computer system to its previous normal state using a state information block selected by the user among state information blocks included in the state information database 532 of the auxiliary memory unit 530. The auxiliary memory unit 530, such as a hard disk driver, a floppy disk driver, and a tape driver, stores programs and data files which are to be loaded in the main memory 510 and then executed.

The conflict repair CD-ROM 540 is used when a conflict, unable to be fixed even by existing backed-up state information and diagnosis information, is generated in the computer system having a conflict repair function according to the present invention or when the user intends to newly install the operating system and application programs of the computer system.

Figure 6:
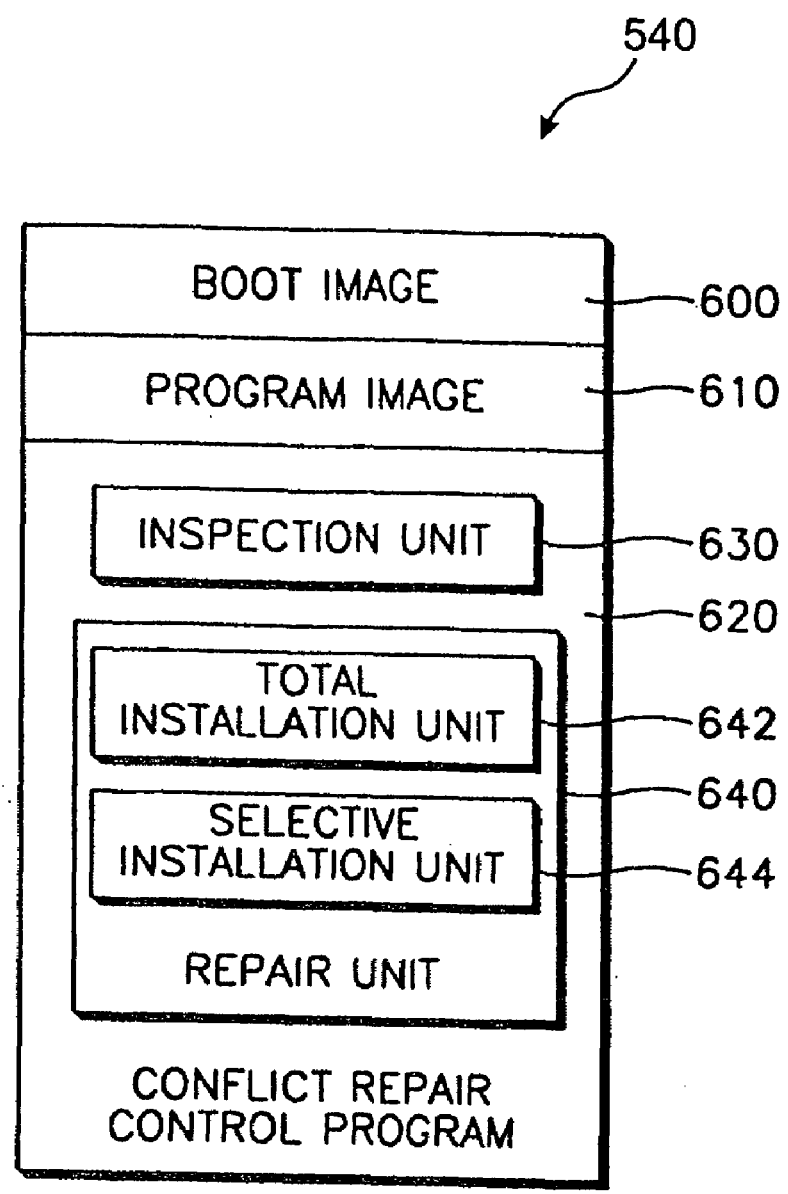
FIG. 6 shows the contents recorded in a recording medium for fixing a conflict of a computer system according to the present invention.

Referring to FIG. 6, the recording medium for conflict repair may be a CD-ROM that records a boot image 600 for booting the computer system form a CD-ROM driver, a program image 610 of an operating system and application programs to be installed, and a CD-ROM repair control program 620. The boot image 600 is an image of system files included in an operating system for managing the operation of a computer system by being loaded in the main memory 510 of the computer system when the computer system sets a CD-ROM driver as a master device to be booted. The program image 610 is a back-up image of an operating system and application systems which are basically installed in the auxiliary memory unit 530 in the computer system. The program image 610 is compressed and backed up. The program image 610 includes a list of the title, size, directory, and attribute of each file to allow the user to select files to be installed in the auxiliary memory unit 530.

The CD-ROM repair control program 620 includes an inspection code means 630 and a repair code means 640. The inspection code means 630 is loaded in the main memory 510 provided in the computer system and inspects whether the auxiliary memory unit 530 is abnormal. The repair code means 640 repairs damaged files in the auxiliary memory unit 530 using the program image 610 stored in the conflict repair CD-ROM 540. Also, the repair code means 640 includes a total installation portion 642 for newly installing all the programs included in the program image, and a selective installation unit 644 for selecting and installing only programs desired by a user. The user can select either the total installation unit 642 or the selective installation unit 644.

Figure 7:
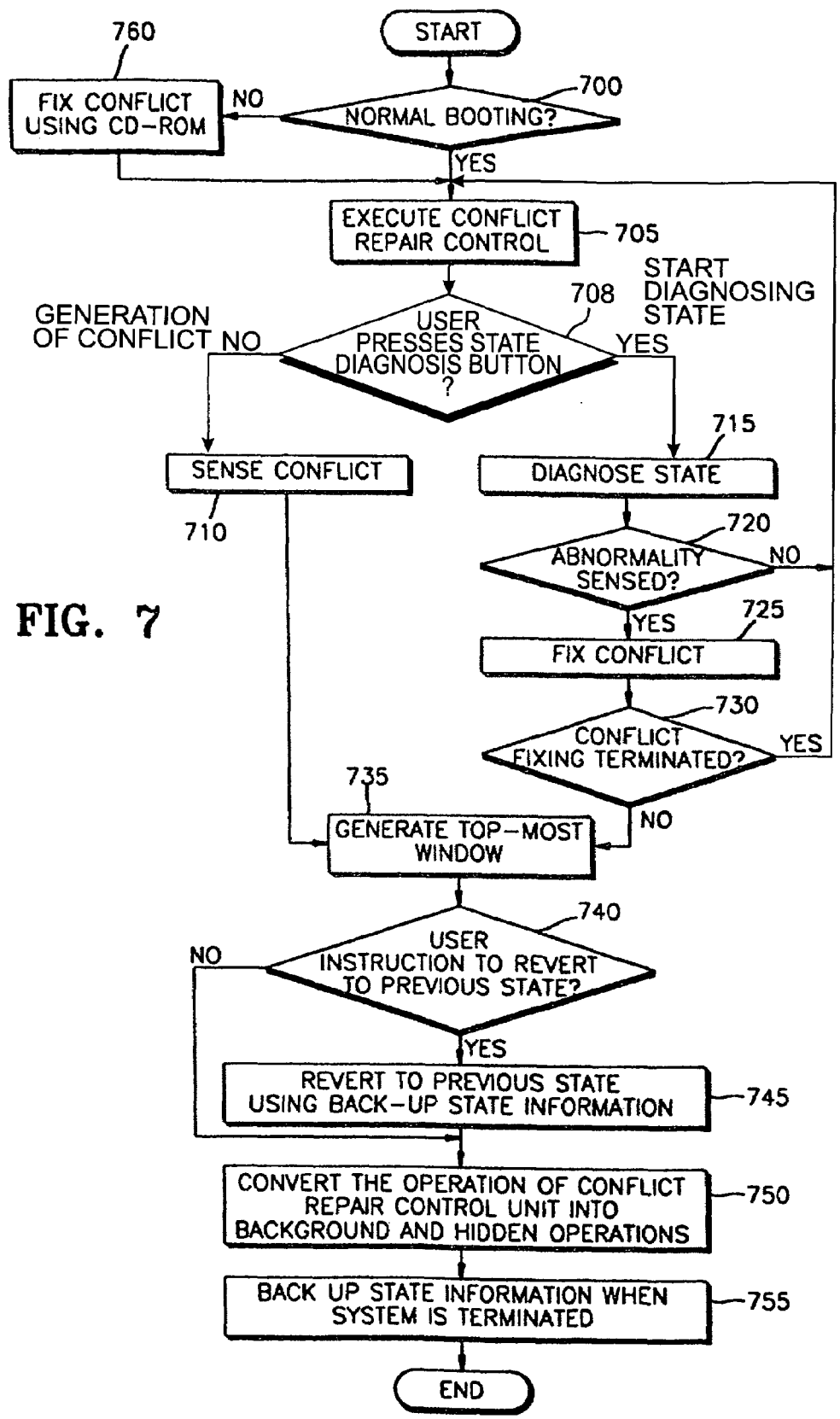
FIG. 7 is a flowchart illustrating a process for reverting a computer system to its previous normal state, according to the present invention.

The operation of the present invention will now be described in detail. Referring to FIG. 7, a process for reverting a computer system to its initial software installation state is as follows. First, when the computer system is normally booted, conflict repair control is executed in a background operation to periodically inspect the computer system, in steps 700 and 705. When the conflict repair control unit senses a GPF, a system registry error, or a system hardware information abnormality from the computer system, the computer itself may initiate a self-diagnosis program in step 705 or the user can push button 525 of input/output unit 520 in step 708 to initiate self-diagnosis, it generates a top most window and receives instructions from the user, in steps 710 and 735. When the user presses down on a state diagnostic button to check his or her computer system, the state of the computer system is diagnosed, and when a conflict is sensed, the conflict is immediately fixed using diagnosed contents, in steps 715 through 725. However, when the sensed conflict cannot be fixed by the diagnosed contents, the conflict repair control unit generates the top most window and receives an instruction from the user, in steps 730 and 735.

Figure 8:
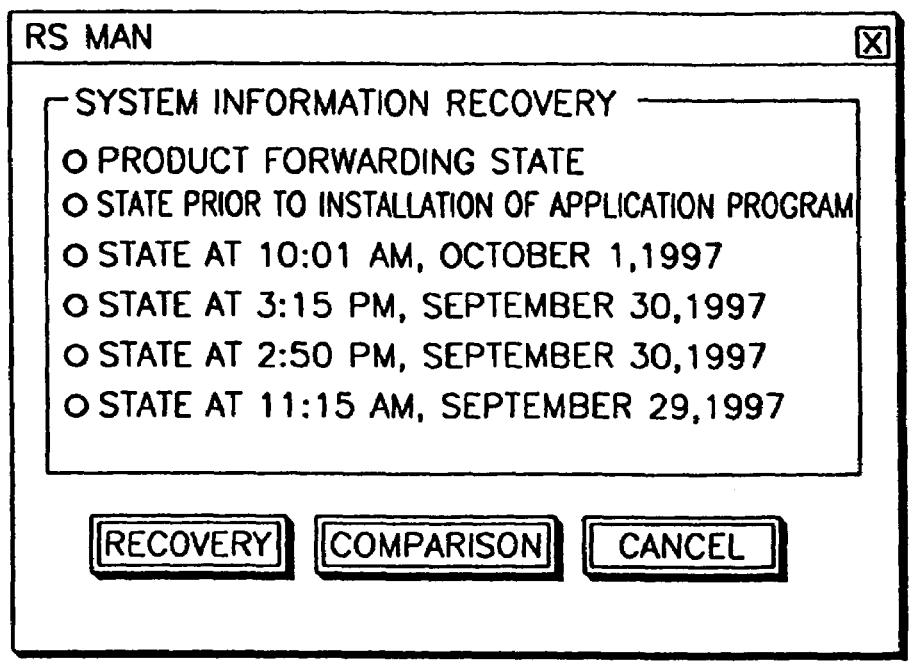
FIG. 8 shows an example of a user interface which displays to a user a list of state information stored in a state information database.

At this time, the conflict repair control unit presents a list of state information stored in the state information database of the auxiliary memory unit to the user. FIG. 8 shows an example of a window for displaying a list of state information stored in the state information database to the user. When the user selects a state information item from the state information list so that the computer system reverts to its original state, the conflict repair control unit reads out the selected state information from the auxiliary memory unit so that the computer system reverts to a state before the state information was backed up, in steps 740 and 745. When the revert to a previous state is completed or the user does not want the revert to an original state, the conflict repair control unit reverts to the background operation and a hidden operation, in step 750.

When the computer system is terminated, the conflict repair control unit inspects the state information of the system, and the inspected system state information is stored in the state information database of the auxiliary memory unit, in step 755. Here, when previously allocated regions for the state information database of the auxiliary memory unit are all used, new state information is overwritten in a region storing the oldest state information. When the computer system is abnormally booted or the user determines that a serious conflict is generated on the computer system, conflict repair is tried using the conflict repair CD-ROM, in step 760. The conflict fixing process using the conflict repair CD-ROM will now be described referring to FIG. 9.

The CD-ROM device 130 is determined as a master device, the boot image of FIG. 6 is loaded in the main memory of the computer system, and thus the computer system is booted from a CD-ROM disk, in step 900. The user loads the CD-ROM repair control unit of the CD-ROM of FIG. 6 in the main memory of the computer system, and executes the CD-ROM repair control program to check the state of a hard disk device, in step 905. Here, a scandisk command provided by MS-DOS® can be used. The CD-ROM repair control program repairs a system file where abnormality is sensed by executing the scandisk to a content read from the program image of the CD-ROM, and boots the computer system again by determining the hard disk device as a master device, in step 910.

When any of the booting by the MS-DOS® and that by the Windows® is not properly accomplished, it is determined that a serious conflict occurs on a hard disk, and the CD-ROM device is set to be a master device and the computer system is thus booted from the CD-ROM disk, in steps 915, 920 and 940. Thereafter, the CD-ROM repair control program is again executed. At this time, the CD-ROM repair control program compresses all the data files stored in the hard disk and backs up the compressed data files to another auxiliary memory unit of the computer system, in step 925. Here, the another auxiliary memory unit can be a floppy disk or other hard disks with no conflict. The CD-ROM repair control unit newly partitions and formats the hard disk using FDISK and FORMAT commands of MS-DOS®, in step 930. An operating system is again installed in the hard disk by reading system files from the program image of the conflict repair CD-ROM, in step 935. When both the booting by the MS-DOS® and that by the Windows® are properly accomplished, the CD-ROM repair control program is executed to analyze the state of programs installed in the hard disk, in steps 915, 940 and 945.

The CD-ROM repair control program deletes all abnormal programs, releases the compression of the images of application programs among program images shown in FIG. 6, and installs the compression-released programs in the hard disk again, in steps 950 and 955. The CD-ROM repair control program finishes recovery of the hard disk by reading the image of data files backed up in step 925 and again storing the read data files in the hard disk, in step 960. Meanwhile, an embodiment of the method of reverting the computer system to its previous state according to FIG. 7, and an embodiment of the method of fixing a conflict of the auxiliary memory unit of the computer system according to FIG. 9, each can be written in a program which can be executed in a computer. Also, these embodiments can be accomplished in a common-use digital computer which operates a program from a medium used in a computer. The medium includes a magnetic storage medium (e.g., a ROM, a floppy disk, a hard disk, etc.), and an optical reading medium (e.g., a CD-ROM, a DVD, etc.). The data and information stored on the medium may be transmitted along a transmission path such as a carrier wave (e.g., transmission via Internet).

A functional program, code and code segments for accomplishing the present invention can be easily inferred by programmers skilled in the art to which the present invention pertains. According to the present invention, a conflict generated on a personal computer system can be easily fixed. When an unrepairable conflict occurs, the computer system with the conflict can easily revert to its previous state using existing state information. Also, when a serious conflict is generated on an auxiliary memory unit including a hard disk device, the conflict can be easily repaired by image files recorded in a CDROM.

What is claimed is:

1. A recording medium for fixing a conflict of a computer system, comprising:
   a boot image loaded in a main memory installed in the computer system when the computer system is booted, for managing the operation of the computer system;
   a program image consisting of an operating system and application programs to be installed in an auxiliary memory unit of the computer system, and a list of the operating system and application programs; and
   a conflict repair control program having a code means (a) loaded in the main memory of the computer system for checking whether the auxiliary memory unit is normal, and a code means (b) for repairing damaged files in the auxiliary memory unit using the program image when abnormality exists in the auxiliary memory unit, wherein the code means (b) of the conflict repair control program comprises:
      a code unit for newly installing all the files included in the program image in the auxiliary memory unit; and
      a code unit for displaying the list included in the program image and newly installing only programs selected by a user in the auxiliary memory unit.

2. The recording medium for fixing a conflict of a computer system as claimed in claim 1, wherein the recording medium is a CD-ROM.

3. The recording medium of claim 1, said checking and said repairing occurring when said computer system is fully booted to a graphical user interface of a desktop of an operating system.

4. The recording medium of claim 1, said damaged files not preventing said computer system from booting.

5. A computer system having a conflict repair function and including a control unit, a main memory, an auxiliary memory, and an input output device, wherein the control unit comprises:
   a state information recording portion for collecting state information on the computer system and recording the collected information in the auxiliary memory;
   a conflict sensing portion for sensing a general protection fault, a system registry fault, and a system hardware information abnormality when the computer system is operated, and reporting the sensed faults to a user via the input output device;
   a state diagnosis portion for diagnosing the presence or absence of abnormality in the computer system according to a user's instruction, attempting to fix an abnormality using diagnosed contents when the abnormality is sensed, and reporting to the user via the input output device abnormality incapable of being fixed by the diagnosed contents; and
   an existing state reverting portion for reverting the computer system to a state when state information selected by the user among state information recorded in the state information database was produced.

6. The computer system having a conflict repair function as claimed in claim 5, wherein the state information recording portion allocates a predetermined region for a state information database in the auxiliary memory, and records new state information which replaces oldest state information.

7. The computer system having a conflict repair function as claimed in claim 5, wherein the input output device further comprises a state diagnosis button, and the state diagnosis portion is performed by a user pressing down on the state diagnosis button.

8. A method of fixing a conflict generated on an auxiliary memory in a computer system using a CD-ROM device including a CD-ROM, comprising the steps of:
   (a) setting the CD-ROM device as a master device, booting the computer system, checking a conflict of the auxiliary memory, and fixing a damaged system file;
   (b) reinstalling an operating system in the auxiliary memory, comprising the substeps of:
   (b.1) setting the CD-ROM device as a master device and booting the computer system again when a new booting when the auxiliary memory is set as the master device fails;
   (b.2) backing up data files stored in the auxiliary memory and formatting the auxiliary memory;
   (b.3) installing an operating system among a program image recorded in the CD-ROM, in the auxiliary memory; and
   (b.4) setting the auxiliary memory as a master device and newly booting the computer system;
   (c) reinstalling application programs in the auxiliary memory using the program image recorded in the CD-ROM;
   (d) restoring the data file backed up in step (b.2) in the auxiliary memory; and
   (e) reverting the computer system to a state previous to the one where a conflict occurred when repairing of the computer system fails.

9. A method of repairing a computer, comprising the steps of:
   turning on power to said computer and letting said computer boot, load an operating system and load a user friendly graphical user interface for said operating system using non-removable media inside said computer when possible;
   checking for a conflict inside said computer by non-removable media inside said computer when said computer has said operating system fully loaded and said user friendly graphical user interface is present;
   repairing any conflicts by non-removable media inside said computer upon detection of said conflicts in said checking step;
   returning to a user friendly graphical user interface for said operating system if all conflicts have been repaired;
   presenting a user on an input/output unit of said computer a plurality of dates and times said computer can revert to based on said dates and times said computer stored state information pertaining to said computer inside a non-removable storage media only when at least one conflict remains unrepaired after said repairing step;
   selecting a date and time to revert said computer to; and
   reloading state information germane to said date and time selected by said user resulting in said computer reverting to an earlier time when said computer did not have said unrepairable conflict and displaying a user friendly graphical user interface for said operating system at said date and time that said computer was reverted to.

10. The method of claim 9, said conflict selected from the group consisting of a general protection fault, system registry fault and abnormality of system hardware information.

11. The method of claim 9, the checking and the repairing steps occurring when the computer is at desktop, the returning step not being a booting step.

12. The method of claim 9, said conflicts not preventing said computer from booting.

13. The method of claim 9, said checking step initiated by a user pressing a diagnosis button on an input/output portion of said computer.

14. The method of claim 9, said checking step being run automatically periodically by non-removable media inside said computer.

15. The method of claim 9, said booting, loading an operating system, and providing a user friendly graphical user interface being performed by a CD-ROM disk only if said non-removable media inside said computer fails to boot, load said operating system and provide a user friendly graphical user interface germane to said operating system to a user.

16. The method of claim 9, wherein capacity of said main memory, type of video card, resolution of video card, color gradation of said video card, recognition of an MPEG card, state of modem, state of each floppy disk drive, state of each CD-ROM drive, state of each DVD drive, and serial/parallel ports are checked to determine if a conflict exists within said computer after said operating system is fully loaded on said computer.

17. The method of claim 9, said state information comprising:
a registry of said operating system; and
sate data of device drivers.

18. The method of claim 15, wherein said CD-ROM backs up data files stored on said non-removable media of said computer, and partitions and formats said non-removable media inside said computer after booting said computer and prior to installation of said operating system onto said computer.

19. The method of claim 18, further comprising the steps of:
searching for conflicts in said non-removable media inside said computer by using said CD-ROM;
repairing any conflicts found in said non-removable media of said computer by said CD-ROM; and
reinstalling said backed-up data files to said non-removable media inside said computer.

20. A computer, comprising:
a central processing unit for controlling the overall operation of said computer;
an input/output device enabling a user to interact with said computer;
a main memory storing program files and data files;
an auxiliary memory;
a non-removable conflict control unit that is accessed by said computer whenever a conflict within said computer is encountered after a graphical user interface for an operating system is presented to a user via said input/output device, said conflict control unit including a conflict sensing portion to perform a diagnosis on said computer to determine if a conflict is present when said computer is displaying a user-friendly interface germane to said operating system via said input/output device to a user; and
a CD-ROM drive used to boot up said computer, load an operating system and provide a graphical user interface when said computer fails to achieve said graphical user interface germane to said operating system.

21. The computer of claim 20, comprised of said conflict control unit including repair software to repair conflicts sensed by said conflict sensing portion.

22. The computer of claim 20, comprised of said conflict being selected from the group consisting of a general protection fault, system registry fault, and abnormality of system hardware information, said conflict not interfering with the booting process, the loading of said operating system process and the loading of said user-friendly graphical user interface germane to said operating system.

23. The computer of claim 20, comprised of said conflict control unit including a recording portion recording state information of said computer at various times prior to installation or changes to software in said computer.

24. The computer of claim 20, said auxiliary memory providing said input/output device with a list of dates and times said computer can revert to by reloading state information stored at each respective date and time listed when said conflict control portion is unable to resolve discovered conflicts.

25. The computer of claim 20, said conflict control unit reverting said computer by reloading state information stored in said computer at a prior date and time upon user input via said input/output device when said conflict control portion is unable to resolve discovered conflicts.

26. The computer of claim 20, said conflict selected from the group consisting of a general protection fault, system registry fault and abnormality of system hardware information.

27. The computer of claim 20, said input/output device comprising a button that a user can push to cause said conflict control unit to search for conflicts within said computer system and attempt to repair any discovered conflicts without the use of media that is removable from said computer.

28. The computer of claim 20, wherein capacity of said main memory, type of video card, resolution of video card, color gradation of said video card, recognition of an MPEG card, state of modem, state of each floppy disk drive, state of each CD-ROM drive, state of each DVD drive, and serial/parallel ports are checked to determine if a conflict exists within said computer after said operating system is fully loaded on said computer.

29. The computer of claim 23, said state information comprising:
a registry of said operating system; and
state data of device drivers.

* * * * *